United States Patent

[11] 3,539,136

| [72] | Inventor | Leonard S. Suozzo<br>366 Maple Hill Drive, Hackensack, New Jersey 07601 |
|---|---|---|
| [21] | Appl. No. | 807,048 |
| [22] | Filed | March 13, 1969 |
| [45] | Patented | Nov. 10, 1970 |

[54] THERMO-MECHANICAL MULTI-FUNCTION SUPPORT DEVICE
25 Claims, 11 Drawing Figs.

[52] U.S. Cl. ................................................. 248/54, 248/59
[51] Int. Cl. .................................................. F16l 3/20
[50] Field of Search .................................... 248/54(CS), 54, 58, 59

[56] References Cited
UNITED STATES PATENTS
2,923,507  2/1960  Suozzo ........................ 248/54
3,148,870  9/1964  Suozzo ........................ 248/54X Primary Examiner—Chancellor E. Harris
Attorney—F. J. Pisarra ABSTRACT: A device for use with piping or other equipment that is subject to changes in position due to variations in its thermal condition. The device is devoid of springs and comprises actuating means, which is secured to the piping at spaced first and second locations and is movable relative to the piping in response and in direct proportion to the expansion or contraction resulting from said variations in thermal condition, and coupling means. The actuating means includes a rigid member pivotally connected to the piping at the first location and a bell lever pivotally connected to the piping at the second location and pivotally connected to the rigid member. The coupling means is pivotally connected at one end to the bell lever and at its other end to a stationary support and may include multiplying linkages.

INVENTOR.
LEONARD S. SUOZZO
BY F. J. Pizarro
Attorney

INVENTOR.
LEONARD S. SUOZZO
BY
F. J. Pisarra
Attorney 3,539,136

THERMO-MECHANICAL MULTI-FUNCTION SUPPORT DEVICE

BACKGROUND OF THE INVENTION

This invention relates in general to a device for properly and effectively supporting and/or controlling movement of piping or other equipment that is subject to changes in position due to variations in its thermal condition. The device of this invention is multifunctional in that it may beneficially serve in a wide variety of capacities, depending on specific applications. The subject device may be advantageously employed, by way of example, as:

1. A shock and sway arrestor;
2. A springless constant support;
3. An assist to known spring supports to render them truly constant; and/or
4. A positioner for piping.

In each of above examples 2, 3 and 4, the subject device also functions as a shock and vibration arrestor.

As a shock and sway arrestor, there have been a number of developments in recent years in the field of shock and sway arrestors. Such arrestors include a category employing a hydraulic unit and intended for use with piping of the character indicated. These arrestors are commonly referred to as "hydraulic arrestors". While hydraulic arrestors represent advances in the art and are satisfactory and suitable for use in open and readily accessible locales, they are not acceptable for use in locations that are difficult or virtually impossible of access after installation. The reason for this is that the hydraulic unit, due to unavoidable leakage of its hydraulic fluid, requires periodic replenishment of such fluid.

The device of this invention is free of the objections to hydraulic arrestors as it is completely mechanical. Moreover, the present device affords a number of worthwhile advantages over hydraulic arrestors, as will be evident to persons trained in the art from the detailed description that follows.

As a springless constant support, it has heretofore been the practice to support piping of the stated type by means of apparatus known to the art as "constant spring supports" which are characterized by the fact that they require at least one spring. Such supports are not truly constant, however, due to unavoidable and objectionable friction developed between relatively movable parts and inherent hysteresis of the metal of the springs. While this represents a serious objection which has long been recognized, industry has been compelled to employ constant spring supports in the absence of more suitable apparatus.

The inventive device is completely devoid of springs and is adapted in use to exert a truly constant supporting force on the piping, as will be evident from a consideration of certain of the herein disclosed embodiments of the invention.

As an assist, as is indicated above, the device of this invention may be used alone and serve as a truly constant support. The device may also be used as an adjunct or assist to known spring supports to compensate for their deficiencies, due to friction and hysteresis, and thereby render the spring supports truly constant. This applies not only to constant spring supports but also to variable spring supports.

As a positioner, the device of my present invention is capable of properly positioning piping or other equipment of the character indicated, as will also be evident from the detailed description that follows. This capability may be utilized whether the device is employed as a shock and sway arrestor, as a constant support or as an assist to a spring support.

SUMMARY OF THE INVENTION

The device of this invention is intended for use with piping or other equipment that is subject to changes in position due to variations in its thermal condition. The device comprises two basic means, namely actuating means, adapted to be secured to the piping at spaced first and second locations and to move relative to the piping in response and in direct proportion to said variations in thermal condition, and coupling means pivotally connected to the actuating means and adapted to be connected to a stationary support. The actuating means includes a rigid member, which is adapted to be pivotally connected to the piping at said first location, and a lever, which is pivotally connected to the rigid member and is adapted to be pivotally connected to the piping at said second location. The coupling means is adjustable in length, is pivotally connected at one end to the lever and is adapted to be pivotally connected at its other end to a stationary support and may include multiplying linkages.

The principal object of this invention is the provision of a device that is adapted to be advantageously employed with piping or other equipment of the stated type and that functions properly and effectively as (1) a shock and sway arrestor, (2) a springless constant support, (3) an assist to conventional spring supports to render them truly constant and/or (4) a positioner.

Another object of the invention is to provide a device of the character indicated that is entirely mechanical in construction and that is devoid of hydraulic units, which are incorporated in certain categories of present day shock and sway arrestors, and springs, which are essential elements of conventional constant supports for piping and the like.

A further object of the invention is to provide a device of the character indicated that is simple and compact in design; that is sturdy and durable in construction; that is reasonable in manufacturing and installation costs; and that is capable of performing its intended functions in a dependable and trouble-free manner.

The enumerated objects and other objects, together with the advantages of the invention will be readily understood by persons trained in the art from the following detailed description and the accompanying drawings which describe and illustrate several embodiments of the invention.

BRIEF DESCRIPTION OF THE DRAWINGS

In the drawings wherein like reference numerals denote corresponding parts throughout the several views.

DESCRIPTION OF THE PREFERRED EMBODIMENTS

Reference is first had to FIGS. 1, 2, 2A and 2B of the drawings which illustrate an embodiment of the invention that is operatively connected to a section of piping 10, which is encased in a suitable heat-insulating sheath 11, and that serves as a constant support for the piping. For the purpose of this disclosure, it is assumed that piping section 10 is part of a piping system employed in a high temperature steam power plant. It is not uncommon in modern power plants to utilize piping systems to transmit steam at temperatures in excess of 1,000° F and at pressures greater than 1,500 pounds per square inch. Such systems require adequate support to allow and compensate for movement of the piping due to normal expansion and contraction of the metal thereof.

Figures 2, 2A, 2B:
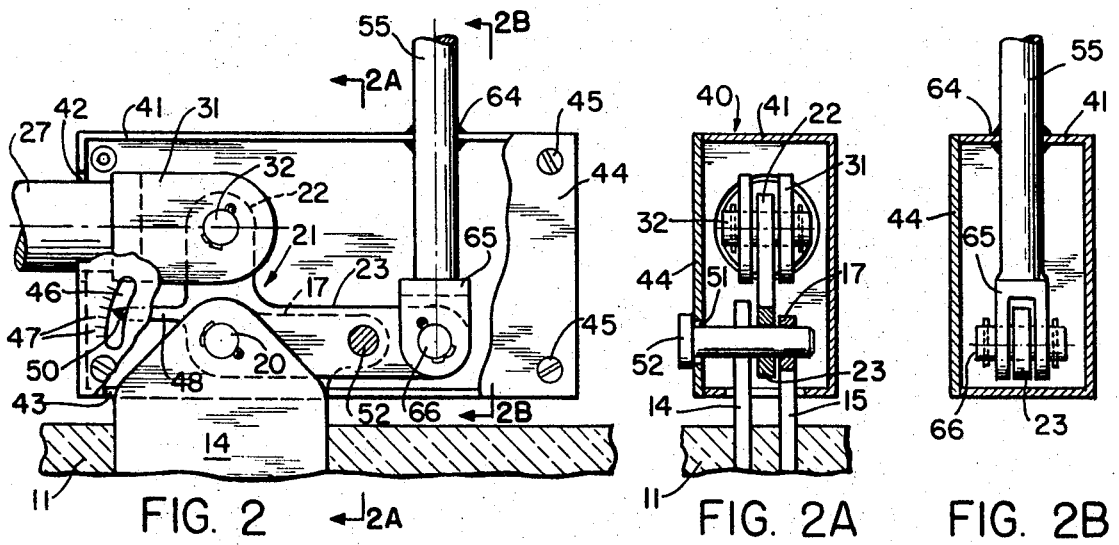
FIG. 2 is a view in enlargement of a portion of FIG. 1, parts being broken away for better illustration of other parts.
FIG. 2A is a view taken along line 2A–2A of FIG. 2.
FIG. 2B is a view taken along line 2B–2B of FIG. 2.

The device shown in the indicated FIGS. of the drawings comprises a pair of spaced, parallel, upstanding plates 12 which are firmly secured at a first location to piping 10 by corresponding weldments 13. Only one of the plates 12 is shown in the drawings. Another pair of spaced, parallel, upstanding plates 14 and 15 is secured to the piping at a second location by weldments 16. Plate 15 has an integral coplanar arm 17 which projects beyond plate 14, as indicated in FIGS. 2 and 2A.

Positioned between and pivotally connected to plates 14 and 15 by a pin 20 is a bell crank or lever 21 consisting of an upstanding arm 22 and a lateral arm 23.

The device also comprises a rectilinear rigid member or link 25 including a pair of rods 26 and 27. One end of rod 26 is equipped with a connector 28 that projects into the space between plates 12 and is pivotally connected thereto by a pin 30. Rod 27 is equipped at one end with a clevis type connector 31. As is shown in FIGS. 2 and 2A, the free end portion of lever arm 22 projects into the space defined by connector 31 and is pivotally connected thereto by a pin 32. The facing end portions of rods 26 and 27 are externally threaded, as indicated at 33 and 34, respectively, for engagement by corresponding lock nuts 35 and 36 and a turnbuckle 37.

Bell lever 21 and associated elements are protectively encased in a housing 40 which includes a rectangular frame 41. This frame is provided with an end opening 42 through which the right end portion of rigid member 25 projects. The frame is also provided with a bottom opening 43 to accommodate the upper portions of plates 14 and 15 (FIG. 2). Housing 40 has a cover plate 44 that is removably secured to the frame by screws 45. The cover plate is formed with an arcuate slot 46 and bears graduations 47 along the slot. Bell lever 21 is provided with an extension 48 that terminates in a pointer 50 which registers with slot 46. Pointer 50 is cooperatively associated with graduations 47 to indicate load travel. Cover plate 44 is also formed with a circular through opening 51 to freely receive a preset pin 52.

Figure 1:
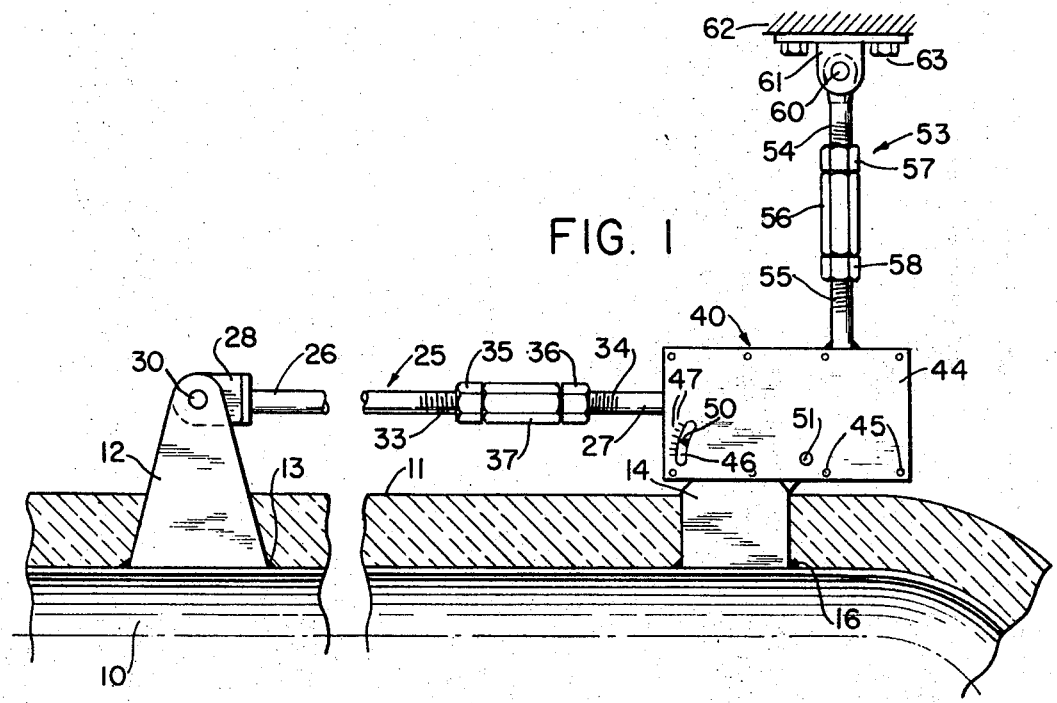
FIG. 1 is a view in side elevation of a device of this invention cooperatively associated with piping, certain parts being broken away and certain other parts being shown in cross section for better illustration.

The device further includes a coupling means, generally indicated by numeral 53, which comprises a pair of rods 54 and 55 that are externally threaded, as shown in FIG. 1, and are interconnected by a turnbuckle 56 to adjust the effective length. Rods 54 and 55 are equipped with respective lock nuts 57 and 58. The upper end of rod 54 is pivotally connected by a pin 60 to bracket 61 which is securely anchored to stationary overhead support, such as a beam 62, by bolts or the like 63.

As is best shown in FIGS. 2 and 2B, rod 55 extends into housing 40 and is rigidly secured to frame 41 by a weldment 64. A clevis type connector 65 is affixed to the lower end of rod 55 and is pivotally connected to bell lever arm 23 by a pin 66.

The several pins 20, 30, 32, 60 and 66 define spaced, parallel pivotal axes.

At the time of manufacture, bell lever 21 is releasably locked to plate arm 17 by preset pin 52 which, as shown in FIG. 2A, extends through cover opening 51 and registers with previously aligned openings in arms 23 and 17. The preset pin is removed in the course of installation.

For the purpose of outlining the operation of the above-described embodiment of the invention, it is assumed that the device has been installed, that the parts are in the relative position shown in FIGS. 1 and 2 and that preset pin 52 has been removed. It will be evident that piping 10 is being directly supported by the device. It is also assumed that the piping system is initially in "cold condition", the temperature of piping 10 being substantially the same as that of the ambient atmosphere, for example, 70° F.

When the piping system is placed in active service, steam generated by the power plant is transmitted therethrough and the temperature of the piping is gradually increased to a maximum predetermined level, for example, 1,070° F. As a consequence of this temperature increase, the piping system is caused to expand or elongate and its position is changed. The elongation of the portion of piping 10 between plates 12 and 14, due to the temperature increase, actuates the inventive device, whereby bell lever 21 is pivoted in a counterclockwise direction to an extent that is directly proportional to such elongation through the medium of rigid member 25. Due to the interconnection of actuating means 53 with the bell lever, the piping is lowered a distance corresponding to the angular movement of the bell lever. Since the pivots 30 and 60 are fixed, the bell crank 21 not only will pivot counterclockwise about its pivot 20 but also will be displaced bodily downward to cause the piping to be lowered due to the fact that the pivot 20 is carried by the plates 14 and 15 affixed thereto. Thus, the device of this invention both supports the piping and causes it to move to its calculated or actual normal position due to variations in the temperature of the piping, while fully supporting same.

At such time as the power plant is shut down, the temperature of the piping gradually reduces from 1,070° F to the ambient temperature of about 70° F and the piping contracts. Such contraction of the piping causes the device to operate in a reverse manner, thereby causing the piping to assume its calculated or normal condition at all times during cooling.

It will be noted that rigid member 25 is spaced from piping 10 and that its temperature, as well as that of bell lever 21 and coupling means 53, is essentially the same at all times as the ambient temperature. Also, the effective lengths of rigid member 25 and actuating means 53 may be readily adjusted at the time of installation through the medium of their respective turnbuckles 37 and 56.

Figure 3:
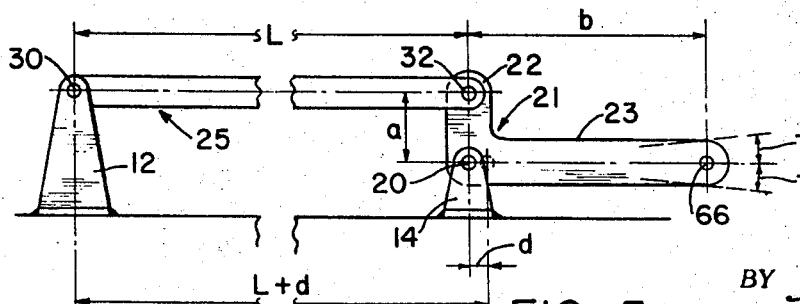
FIG. 3 is a partly diagrammatic view in side elevation of certain of the interconnected elements shown in FIGS. 1 and 2.

The length of rigid member 25 may be determined by application of the following equations, having reference to FIG. 3:

Equation 1: $T = d \times \frac{b}{a}$ and

Equation 2: $L = \frac{d}{E}$ wherein:

T is the travel of the piping (actual or calculated);

d is the distance that the axis of pin 20 moves to the right relative to the axis of pin 30 due to an increase in temperature of the piping from 70° F to 1,070° F;

a is the effective length of bell crank arm 22, i.e. the distance between the axes of pins 20 and 32;

b is the effective length of bell crank arm 23, i.e. the distance between the axes of pins 20 and 66;

L is the effective length of rigid member 25, i.e. the distance between the axes of pins 30 and 32; and E is the coefficient of expansion per foot of piping 10.

Assuming the values: T = 2 inches; a = 3 inches; b = 12 inches; and E = .08, Equation 1 is solved for d and Equation 2 is then solved for L as follows:

$$2 = d \times \frac{12}{3}$$

$$d = \frac{6}{12} = .5 \text{ or } \frac{1''}{2}$$

$$L = \frac{.5}{.08} = 6.25 \text{ or } 6'3''$$

Piping travel T is frequently much greater in practice than the 2 inches of the foregoing example and may at times amount to 10 inches or more. Assuming a piping travel of 10 inches, it would be commercially impractical to utilize the above described construction having the stated values since this would require a rigid member 25 having an effective length L of 31.25 feet.

Figure 4:
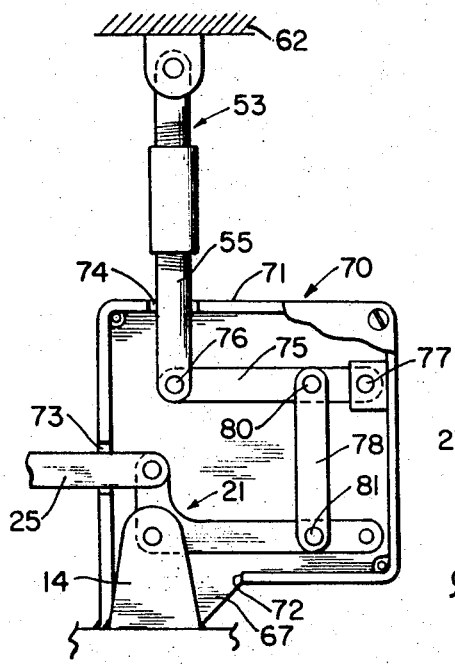
FIG. 4 is a view in front elevation of a modification of the construction shown in FIG. 2.
Figure 5:
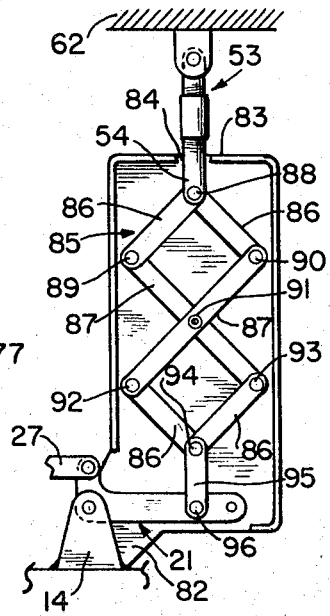
FIG. 5 also corresponds to FIG. 2 and illustrates another modification of the invention.

FIGS. 4 and 5 illustrate recommended modifications of the invention which permit of relatively great piping travel without unduly increasing the effective length of rigid member 25. These modifications contemplate use of corresponding linkages for "multiplying" the effect of piping travel T.

Referring now to FIG. 4, the modification of the invention shown therein includes a member 67 corresponding to plate 15. A housing 70 includes a frame 71 which is integral with member 67 and is provided with a bottom opening 72 to accommodate plate 14, a side opening 73 to receive the end portion of rigid member 25 and a top opening 74 through which rod 55 freely projects. Positioned within housing 70 is a multiplying linkage consisting of a link 75 which is pivotally connected to the lower end of rod 55 by a pin 76 and to frame 71 by a pin 77 and a link 78 which is pivotally connected to link 75 by a pin 80 and to bell lever 21 by a pin 81.

The modification of the invention shown in FIG. 5 includes a member 82 and a housing frame 83 corresponding respectively to member 67 and frame 71 of FIG. 4. This modification utilizes a multiplying linkage in the form of an extensible and contractible pantograph 85 which comprises four relatively short links 86 and two relatively long links 87 which are arranged as shown and interconnected by pivot pins 88 through 94. Pin 88 serves as a pivotal connection for the upper pair of links 86 and rod 54; pin 91 serves as a pivotal connection for links 87 and frame 83; and pin 94 serves as a pivotal connection for the lower pair of links 86 and a further link 95 which is connected to bell lever 21 by a pivot pin 96.

Figure 6:
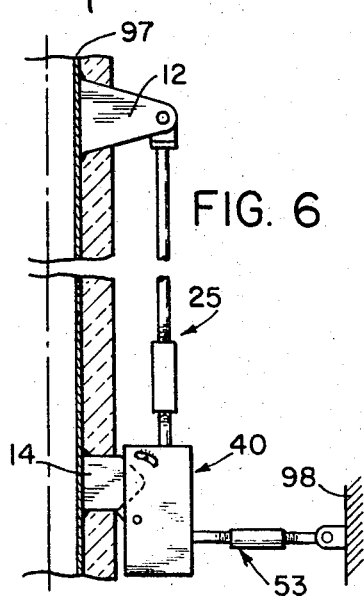
FIG. 6 is a view in front elevation of the device of FIG. 1, when used as a sway brace.

The modification of the invention shown in FIG. 6 depicts a recommended manner in which the device of this invention may be advantageously employed as a shock and sway arrestor. The inventive device per se of FIG. 6 is the same as the one shown in FIG. 1. However, the plates 12 and 14 are mounted on a vertical section of piping 97, instead of being mounted on a horizontal section of piping 10 (FIG. 1). Similarly, coupling means 53 is anchored to a vertical stationary support, such as a building column 98, instead of to an overhead support.

Figure 7:
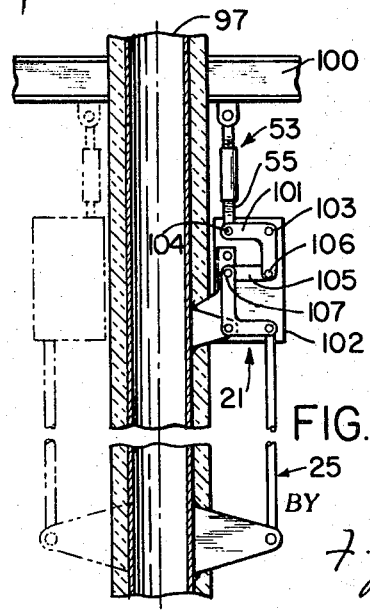
FIG. 7 is a view in front elevation and illustrates another modification of the invention.

FIG. 7 illustrates another modification of the invention that is also applied to vertical piping section 97 and that is anchored to an overhead beam 100. The parts of this modification are closely related to those of FIGS. 1 and 4 and include a multiplying linkage which is somewhat different from that of FIG. 4. The multiplying linkage of FIG. 7 consists of a bell crank 101, which is connected to a housing frame 102 by a pivot pin 103 and to rod 55 by a pivot pin 104, and a straight link 105 which is connected to bell crank 101 by a pivot pin 106 and to bell crank 21 by a pivot pin 107. It is recommended that a duplicate of the device be mounted to the opposite side of piping 97, as represented by the dot-dash lines, for purposes of obtaining a balanced arrangement.

As stated earlier herein, the present invention may be advantageously employed as an assist or adjunct to a so-called constant spring support to render it truly constant. It may also be employed as an adjunct to a variable spring support whereby the latter will, in effect, function as a truly constant support. In either case, the inventive device is so arranged with respect to the spring support and the piping or other equipment, as illustrated in the modification of FIG. 8, as to compensate for friction and hysteresis.

Figure 8:
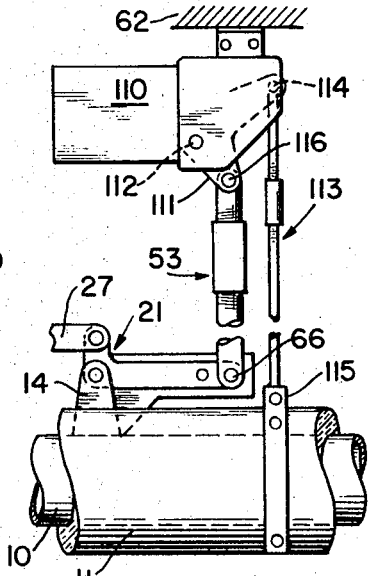
FIG. 8 is a view in front elevation and illustrates the manner of utilizing the form of the invention shown in FIGS. 1 and 2 as an assist for a spring support.

Referring specifically to FIG. 8, the construction shown therein includes a spring support device 110 which is anchored in depending relation to overhead stationary support 62. Spring support 110 may be of the type disclosed in my U.S. Pat. No 2,923,507 for "Constant Spring Support Device" or my U.S. Pat. No. 3,148,870 for "Spring Support Device". Spring support 110 includes a bell crank 111 that is pivoted for rotation about the axis of a pin or shaft 112. One arm of bell crank 111 is connected by a pivot pin 114 to the upper end of a load-carrying unit 113 which is connected at its lower end to a strap 115 that circumscribes the piping.

Only portions of the inventive device of FIGS. 1 and 2 are shown in FIG. 8, it being understood that the piping is equipped with the complete inventive device. In the illustrated construction, coupling means 53 is connected to the other arm of bell crank 111 by a pivot pin 116, instead of being directly connected to support 62 as shown in FIG. 1. It will be evident to persons skilled in the art that spring support 110 operates in its normal intended manner to exert a supporting force to the piping and that the device of FIG. 1 cooperates with the spring support and the piping whereby the piping is at all times subjected to a truly constant support force.

Each of the above described embodiments of the invention contemplates the utilization of a rigid member 25 which is spaced from the piping and which is, at all times, at a temperature substantially the same as the ambient temperature. In those embodiments, the effective length of rigid member 25 remains substantially constant, regardless of the temperature of the piping.

Figure 9:
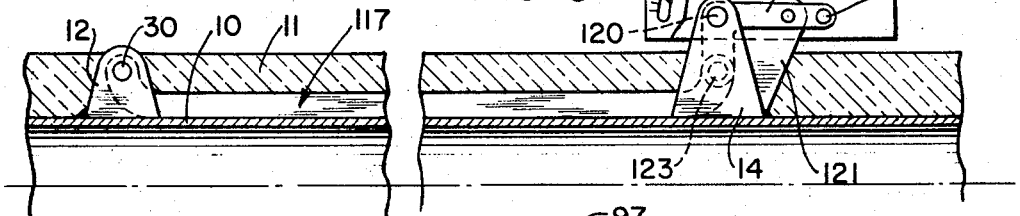
FIG. 9 is a view in front elevation of a further form of the invention, certain parts being broken away and certain other parts being shown in cross section for better illustration.

It is within the purview of this invention, as embodied in the modification shown in FIG. 9, to employ a rigid member 117 which is, at all times, at substantially the same temperature as the piping and which varies in effective length depending on the temperature of the piping. Rigid member 117 is made of a metal having a coefficient of expansion that is substantially different from that of piping 10. Assuming that piping 10 is made of stainless steel, it is recommended that member 117 be made of brass or other suitable metal having a coefficient of expansion that is substantially greater than that of stainless steel. The major part of member 117 lies along and is in direct and intimate contact with piping 10 and is encased in insulating sheath 11. Means (not shown) may be provided to insure maintaining member 117 in intimate contact with piping 10, while permitting relative bodily movement therebetween.

The construction shown in FIG. 9 also includes a bell crank 118 which may be the same as bell crank 21 but inverted. Bell crank 118 is connected by a pivot pin 120 to plate 14 and an associated plate 121 which corresponds to plate 15 of FIG. 2A. This bell crank is connected at one end to rod 55 by a pivot pin 122 and at its other end to an end of rigid member 117 by a pivot pin 123.

Both piping 10 and rigid member 117 expand or contract in response and in direct proportion to variations in the temperature of the piping. However, member 117 will expand or contract to a greater extent in a lengthwise direction than piping 10 due to the difference in coefficients of expansion of the metals of these parts. As a consequence, rigid member 117 effects corresponding pivotal movement of bell crank 118 about the axis of pin 120. Such pivotal movement of the bell crank may be counterclockwise or clockwise, depending on whether the piping is being subjected to temperature increase or decrease. The operation of the modification of FIG. 9 is in other respects essentially the same as that of FIG. 1.

Based on the foregoing, it is believed that the construction, operation, objects and advantages of my present invention will be readily comprehended by persons skilled in the art, without further description. It is to be clearly understood, however, that various changes in the constructions described above and illustrated in the drawings may be made without departing from the scope of the invention, it being intended that all matter contained in the description or shown in the drawings shall be interpreted as illustrative only and not in a limiting sense.

I claim:

1. A device for use with equipment, such as piping, that is subject to changes in position resulting from expansion or contraction due to variations in its thermal condition comprising:
   a. actuating means adapted to be secured to said piping at spaced first and second locations and to move relative to said piping as said piping expands or contracts in response and in direct proportion to said variations in thermal condition; and
   b. coupling means operably connected to the actuating means and adapted to be connected to a stationary support.

2. A device according to claim 1 wherein the actuating means includes:
   a. a rigid member which is spaced from the piping and is subject to ambient temperature in use.
3. A device according to claim 1 wherein the actuating means includes:
   a. a rigid member which is adapted to be placed in intimate contact with the piping and to attain substantially the same temperature as the piping in use, said rigid member having a coefficient of expansion which is substantially different from that of the piping.
4. A device according to claim 3 wherein the coefficient of expansion of the rigid member is substantially higher than that of the piping.
5. A device according to claim 1 wherein the actuating means includes:
   a. a rigid member adapted to be pivotally connected to the piping at said first location; and
   b. a lever pivotally connected to the rigid member and adapted to be pivotally connected to the piping at said second location.
6. A device according to claim 5 wherein:
   a. the lever comprises:
      1. a bell crank.
7. A device according to claim 1 wherein the coupling means is adjustable in length.
8. A device according to claim 1 wherein the actuating means includes:
   a. a rigid member adapted to be pivotally connected to the piping at said first location; and
   b. a lever pivotally connected to the rigid member and adapted to be pivotally connected to the piping at said second location; and wherein the coupling means is adjustable in length.
9. A device according to claim 1 wherein:
   a. the actuating means includes:
      1. a rigid member;
      2. first connector means adapted to be secured to said piping at said first location;
      3. means for connecting said rigid member to said first connector means for movement about a first pivotal axis;
      4. a lever;
      5. second connector means adapted to be secured to said piping at said second location;
      6. means for connecting said lever to said second connector means for movement about a second pivotal axis; and
      7. third connector means for connecting said rigid member to said lever for movement about a third pivotal axis.
10. A device according to claim 9 wherein the first, second and third pivotal axes are spaced apart and parallel.
11. A device according to claim 1 wherein:
    a. the actuating means includes:
       1. a rigid member;
       2. first connector means adapted to be secured to said piping at said first location;
       3. means for connecting said rigid member to said first connector means for movement about a first pivotal axis;
       4. a lever;
       5. second connector means adapted to be secured to said piping at said second location;
       6. means for connecting said lever to said second connector means for movement about a second pivotal axis; and
       7. third connector means for connecting said rigid member to said lever for movement about a third pivotal axis; and
    1. the coupling means includes:
       1. fourth connector means connected to the lever for movement about a fourth pivotal axis; and
       2. fifth connector means adapted to be connected to a stationary support for movement about a fifth pivotal axis.
12. A device according to claim 11 wherein said pivotal axes are spaced apart and parallel.
13. A device according to claim 12 wherein the coupling means is adjustable in length.
14. A device according to claim 1 wherein:
    a. the coupling means includes:
       1. a multiplying linkage.
15. A device according to claim 1 wherein:
    a. the coupling means includes:
       1. linkage means for varying its effective length and comprising:
          a. a plurality of pivotally interconnected links.
16. A device according to claim 1 wherein:
    a. the coupling means includes:
       1. a pantograph unit for varying its effective length and comprising:
          a. a plurality of links that are pivotally interconnected to form a series of open frames which are extensible and contractible in unison.
17. A device according to claim 5 further comprising:
    a. a housing carried by the coupling means, the lever being positioned within the housing and a portion of the rigid member projecting into and being movable relative to the housing.
18. A device according to claim 17 wherein:
    a. the coupling means includes:
       1. a multiplying linkage that is positioned within the housing.
19. A device according to claim 5 further comprising:
    a. a housing adapted to be secured to piping at said second location, the lever being positioned within the housing and a portion of the rigid member and a portion of the coupling means projecting into and being movable relative to the housing.
20. A device according to claim 19 wherein:
    a. the coupling means includes:
       1. a multiplying linkage that is positioned within the housing.
21. Apparatus for use with equipment, such as piping, that is subject to changes in position resulting from expansion or contraction due to variations in its thermal condition comprising:
    a. a spring support adapted to be secured to a stationary support and including:
       1. a spring biased pivotal lever; and
       2. a load-carrying unit pivotally connected to the lever and adapted to be secured to the piping; and
    b. a device comprising:
       1. actuating means adapted to be secured to said piping at spaced first and second locations and to move relative to said piping as said piping expands or contracts in response and in direct proportion to said variations in thermal condition; and
       2. coupling means operably connected to the actuating means and to the lever.
22. A device according to claim 21 wherein the actuating means includes:
    a. a rigid member which is spaced from the piping and is subject to ambient temperature in use.
23. A device according to claim 21 wherein the actuating means includes:
    a. a rigid member which is adapted to be placed in intimate contact with the piping and to attain substantially the same temperature as the piping in use, said rigid member having a coefficient of expansion which is substantially different from that of the piping.
24. A device according to claim 21 wherein the actuating means includes:
    a. a rigid member adapted to be pivotally connected to the piping at said first location; and b. a bell crank pivotally connected to the rigid member and adapted to be pivotally connected to the piping at said second location.

25. A device according to claim 21 wherein the actuating means includes:
a. a multiplying linkage.